United States Patent

Fancher

[15] 3,700,771
[45] Oct. 24, 1972

[54] 2-AMINOBENZOTHIAZOL PHOSPHATES AND PHOSPHONATES USED AS INSECTICIDES

[72] Inventor: Llewellyn W. Fancher, Orinda, Calif.

[73] Assignee: Stauffer Chemical Company, New York, N.Y.

[22] Filed: Feb. 16, 1971

[21] Appl. No.: 115,871

Related U.S. Application Data

[62] Division of Ser. No. 837,880, June 30, 1969, Pat. No. 3,597,439.

[52] U.S. Cl.................................................424/200
[51] Int. Cl..................................................A01n 9/36
[58] Field of Search....................424/200; 260/305

[56] References Cited

UNITED STATES PATENTS 3,520,929  7/1920  Maravetz....................260/305

Primary Examiner—Albert T. Meyers
Assistant Examiner—Leonard Schenkman
Attorney—Daniel C. Block et al.

[57] ABSTRACT

Compounds of the formula

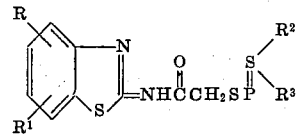

in which R and $R^1$ are hydrogen or halogen, $R^2$ is alkoxy, and $R^3$ is alkoxy or alkyl, are used as insecticides.

7 Claims, No Drawings

2-AMINOBENZOTHIAZOL PHOSPHATES AND PHOSPHONATES USED AS INSECTICIDES

This application is a divisional of copending application, Ser. No. 837,880, filed June 30, 1969 now U.S. Pat. No. 3,597,439.

This invention relates to the use of certain novel chemical compounds as insecticides, more particularly, the compounds are certain 2-aminobenzothiazole phosphates and phosphonates.

The compounds of the present invention that are useful as insecticides are those having the formula:

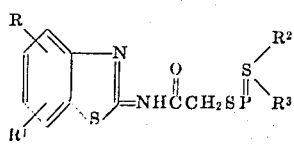

in which R and $R^1$ are hydrogen, or halogen, preferably chlorine, $R^2$ is alkoxy having 1 to 5 carbon atoms, and $R^3$ is alkoxy having one to five carbon atoms, preferably 1 to 3 carbon atoms, or alkyl having one to five carbon atoms, preferably one to two carbon atoms.

The compounds having the formula:

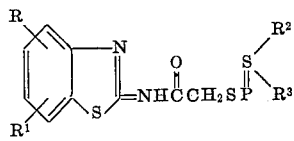

in which R, $R^1$, $R^2$, and $R^3$ are as defined above by the following reactions:

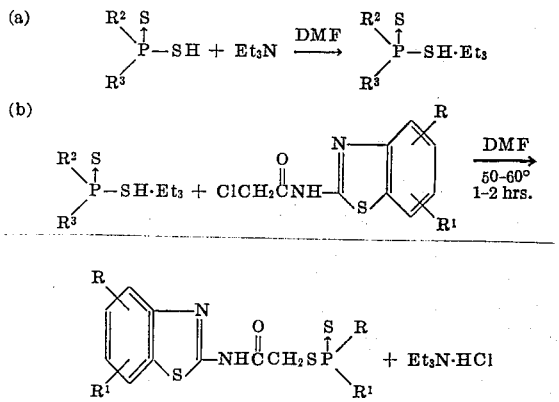

The reaction of a haloacetamide with a salt of an organic phosphate to form an acetamido phosphate is well-known:

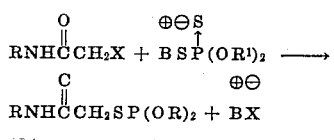

The same general method is used in the preparation of the compounds of this invention; however, certain modifications of the above reaction have been made to simplify the procedure and to insure in most instances, high yields. The modifications include the use of anhydrous triethylamine which obviates the isolation of phosphate salt, and dimethyl formamide as a solvent medium which facilitates and promotes the reaction.

Although other solvents such as ketones, alcohols, benzene-$H_2O$ mixtures, etc., can be used, DMF has been found most advantageous with regard to reaction times and yields. It has also been found that a small excess of triethylamine is advantageous in bringing the reaction to completion.

After the completion of the reaction between the chloroacetamide and the phosphate, or phosphonate amine salt, the product is conveniently isolated by pouring the mixture into water. If the product is a solid, it is filtered off and recrystallized if desired. If the product is a liquid, it can be extracted with a solvent such as benzene, chloroform, etc.

Chloroacetamide derivatives are used for economic reasons; however, bromo or iodoacetamides can also be used.

Preparation of the compounds of this invention is illustrated by the following examples.

EXAMPLE I

2–0 Isopropyl, ethylphosphono dithioylacetamide-benzothiazole

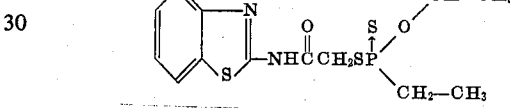

23.9g (0.13M) of 0-isopropyl, ethyl phosphonodithioic acid is diluted with 10 ml. of dimethyl formamide. The mixture is cooled in an ice bath and made slightly basic (below 30° C.) with anhydrous triethylamine (about 19 ml.) (0.14M).

The solution is then added to 18.1g (0.08M) of 2-chloro-acetamidebenzothiazole dissolved in 50 ml. of dimethyl-formamide. A moderate temperature rise occurs on mixing. The reaction is completed by stirring at 50°–60 C. for 2 hours. The liquid product is isolated by extraction with benzene. The yield is 23gm. (77 percent of theory), $N_D^{30}$= 1.6135.

The following is a Table of certain selected compounds that are preparable according to the procedure described hereto. Compound numbers are assigned to each compound and are used throughout the remainder of the Application.

TABLE I

| Compound Number | R | $R^1$ | $R^2$ | $R^3$ | $N_D^{30}$ or m.p. (C.) |
|---|---|---|---|---|---|
| 1 | H | H | $C_2H_5O$ | $C_2H_5O$ | 98–101° |
| 2 | H | H | $CH_3O$ | $CH_3O$ | 1.5850 |
| 3 | H | H | i-$C_3H_7O$ | $C_2H_5$ | 1.6135 |
| 4 | H | H | $C_2H_5O$ | $C_2H_5$ | 1.6292 |
| 5 | H | H | i-$C_4H_9O$ | $C_2H_5$ | 1.6015 |
| 6 | H | H | $CH_3O$ | $C_2H_5$ | 1.6070 |
| 7 | 1-Cl | H | $C_2H_5O$ | $C_2H_5O$ | 117–119° |
| 8 | H | 3-Cl | $C_2H_5O$ | $C_2H_5O$ | 65–69° |
| 9 | 1-Cl | H | i-$C_3H_7O$ | $C_2H_5$ | 66–70° |
| 10 | H | 3-Cl | i-$C_3H_7O$ | $C_2H_5$ | 108–110° |
| 11 | H | 3-Cl | $C_2H_5O$ | $C_2H_5$ | 111–115° |
| 12 | 1-Cl | H | $C_2H_5O$ | $C_2H_5$ | 107–110° |
| 13 | 1-Cl | H | i-$C_4H_9O$ | $C_2H_5$ | 80–84° |

| 14 | H | 3-Cl | i-C$_4$H$_9$O | C$_2$H$_5$ | 77–81° |

INSECTICIDAL EVALUATION TESTS

The following insect species were used in evaluation tests for insecticidal activity:
1. Housefly (HF) — Musca domestica (Linn.)
2. Lygus Bug (LB) — Lygus hesperus (knight)
3. Bean Aphid (BA) — Aphis fabae (Scop.)

The housefly (HF) was used in evaluation tests of selected compounds as insecticides by the following procedure. A stock solution containing 100 μg/ml. of the toxicant in an appropriate solvent was prepared. Aliquots of this solution were combined with 1 milliliter of an acetone-peanut oil solution in a glass Petri dish and allowed to dry. The aliquots were there to achieve desired toxicant concentration ranging from 100 μg/per Petri dish to that at which 50 percent mortality was attained. The Petri dishes were placed in a circular cardboard cage, closed on the bottom with cellophane and covered on top with cloth netting. 25 female houseflies, three to five days old, were introduced into the cage and the percent mortality was recorded after 48 hours. The LD–50 values are expressed in terms of μg per 25 female flies. The results of this insecticidal evaluation test are given in Table II under "HF."

In the Lygus Bug (LB) Lygus hesperus test, ten to 25 two-week old nymphs of Lygus Bug were placed in separate circular cardboard cages, sealed on one end with cellophane, and covered by a cloth netting on the other. Aliquots of the toxicants, dissolved in an appropriate solvent, were diluted in water containing 0.002 percent of a wetting agent, Sponto 221 — (a polyoxyether of alkylated phenols blended with organic sulfonates). Test concentrations ranged from 0.05 percent downward to that at which 50 percent mortality was obtained. Each of the aqueous suspensions of the candidate compounds were sprayed onto the insect through the cloth netting by means of a hand-spray gun. Percent mortality in each case recorded after 24 and 72 hours counts were made to determine living and dead insects. The LD–50 values expressed as percent of toxicant in the aqueous spray were calculated and recorded. These values are reported under the column "LB" in Table II.

The insect species Black Bean Aphid (BA) Aphis fabae (Scop.) was also employed in the test for insecticidal activity. Young nasturtium (Tropaeolum sp.) plants, approximately 2 to 3 inches tall, were used as the host plants for the bean aphid. The host plant was infested with approximately 50 – 75 of the aphids. The test chemical was dissolved in acetone, added to water which contained a small amount of Sponto 221$^R$, an emulsifying agent. The solution was applied as a spray to the infested plants. Concentrations ranged from 0.05 percent downward until an LD–50 value was achieved. These results are given in Table II under the column "-BA."

TABLE II (LD$_{50}$ VALUES)

| Compound Number: | HF μg | LB % | BA % |
|---|---|---|---|
| 1 | 30 | >.05 | .03 |
| 2 | >100 | — | >.05 |
| 3 | >.5 | .05 | .003 |
| 4 | 10 | >.05 | .001 |
| 5 | 30 | .05 | .005 |
| 6 | 100 | >.05 | .03 |
| 7 | 100 | >.05 | >.05 |
| 8 | 12 | >.05 | >.05 |
| 9 | 30 | >.05 | .008 |
| 10 | 9 | >.05 | .005 |
| 11 | 5.5 | >.05 | .005 |
| 12 | 30 | >.05 | .03 |
| 13 | 30 | >.05 | .03 |
| 14 | 30 | .05 | .008 |

As those in the art are well aware, various techniques are available for incorporating the active component or toxicant in suitable pesticidal compositions. Thus, the pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cotton-seed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous medium and such compositions may be produced by forming a concentrated solution of the toxicant in a suitable organic solvent followed by dispersion in water, usually with the aid of surface active agents. The latter, which may be anionic, cationic, or nonionic types, are exemplified by sodium stearate, potassium oleate, and other alkaline metal soaps and detergents such as sodium lauryl sulfate, sodium napthalene sulfonate, sodium alkyl napthalane sulfonate, methyl cellulose, fatty alcohol ethers, polyglycol fatty acid esters and other polyoxyethylene surface active agents. The proportion of these agents commonly comprises 1–15 percent by weight of the pesticidal compositions although the proportion is not critical and may be varied to suit any particular situation.

I claim:

1. A method of controlling insects comprising applying to the habitat thereof an insecticidally effective amount of a compound of the formula:

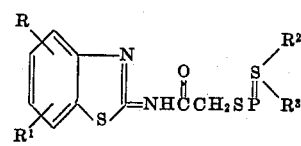

in which R and R$^1$ are hydrogen, or halogen, R$^2$ is alkoxy having one to five carbon atoms, and R$^3$ is alkoxy having one to five carbon atoms, or alkyl having one to five carbon atoms.

2. The method of claim 1 in which R and R$^1$ are hydrogen, R$^2$ is alkoxy having one to five carbon atoms, and R$^3$ is alkyl having one to five carbon atoms.

3. The method of claim 1 in which R is hydrogen, R$^1$ is chlorine, R$^2$ is alkoxy having one to five carbon atoms, and R$^3$ is alkyl having one to five carbon atoms.

4. The method of claim 1 in which $R^2$ is isopropoxy and $R^3$ is ethyl.

5. The method of claim 1 in which $R^2$ is ethoxy, and $R^3$ is ethyl.

6. The method of claim 1 in which R is hydrogen, $R^1$ is 3-chloro, $R^2$ is isopropoxy and $R^3$ is ethyl.

7. The method of claim 1 in which R is hydrogen, $R^1$ is 3-chloro, $R^2$ is ethoxy, and $R^3$ is ethyl.

* * * * *